United States Patent
Chen et al.

(10) Patent No.: US 10,684,926 B2
(45) Date of Patent: Jun. 16, 2020

(54) ONLINE ITERATIVE DATA VERIFICATION FOR SYNCHRONOUS REPLICATION

(71) Applicant: EMC IP Holding Company LLC, Hopkinton, MA (US)

(72) Inventors: Xiangping Chen, Sherborn, MA (US); Svetlana Kronrod, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/167,858

(22) Filed: Oct. 23, 2018

(65) Prior Publication Data
US 2020/0125464 A1    Apr. 23, 2020

(51) Int. Cl.
| | | |
|---|---|---|
| G06F 12/10 | (2016.01) | |
| G06F 11/20 | (2006.01) | |
| G06F 11/14 | (2006.01) | |
| G06F 11/07 | (2006.01) | |
| H04L 29/08 | (2006.01) | |
| H04L 29/06 | (2006.01) | |
| G06F 12/1018 | (2016.01) | |

(52) U.S. Cl.
CPC ...... *G06F 11/2076* (2013.01); *G06F 11/0757* (2013.01); *G06F 11/1464* (2013.01); *G06F 11/2064* (2013.01); *G06F 11/2082* (2013.01); *G06F 12/1018* (2013.01); *H04L 63/12* (2013.01); *H04L 67/1097* (2013.01); *G06F 2201/84* (2013.01)

(58) Field of Classification Search
CPC ............ G06F 12/1018; G06F 11/2064; G06F 11/2082; G06F 11/1464; G06F 11/0757; G06F 11/2076

USPC .......................................................... 711/162
See application file for complete search history.

(56) References Cited

U.S. PATENT DOCUMENTS

| | | |
|---|---|---|
| 7,475,124 B2 | 1/2009 | Jiang et al. |
| 8,327,103 B1 | 12/2012 | Can et al. |
| | (Continued) | |

OTHER PUBLICATIONS

Chuck Ballard et al., "Informix Dynamic Server V10: Superior Data Replication for Availability and Distribution", IBM Redbooks publication, Apr. 2007.*

(Continued)

*Primary Examiner* — Pierre Miche Bataille
(74) *Attorney, Agent, or Firm* — Daly, Crowley, Mofford & Durkee, LLP

(57) ABSTRACT

In one aspect, online iterative data verification for synchronous replication is provided for a storage system that includes a source site and a target site. An aspect includes, during an active synchronous replication process between the source site and the target site, identifying inflight inputs/outputs (IOs). The inflight IOs indicate write operations that are transmitted from the source to the target but are determined to have not yet been stored at the target. A further aspect includes performing a first data verification on the source and target sites. The first data verification is performed for IOs that are not inflight IOs. An aspect also includes performing iterative data verifications during each of one or more replication cycles. The iterative data verifications verify only data written to the target site since one of the first data verification and a previously performed data verification excluding inflight IOs at the time of verification.

20 Claims, 11 Drawing Sheets

(56) References Cited

U.S. PATENT DOCUMENTS

| | | |
|---|---|---|
| 8,380,928 B1 | 2/2013 | Chen et al. |
| 8,429,346 B1 | 4/2013 | Chen et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,583,607 B1 | 11/2013 | Chen et al. |
| 8,683,153 B1 | 3/2014 | Long et al. |
| 8,712,976 B1 | 4/2014 | Chen et al. |
| 8,775,388 B1 | 7/2014 | Chen et al. |
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,104,326 B2 | 8/2015 | Frank et al. |
| 9,152,336 B1 | 10/2015 | Chen et al. |
| 9,208,162 B1 | 12/2015 | Hallak et al. |
| 9,304,889 B1 | 4/2016 | Chen et al. |
| 9,355,112 B1 | 5/2016 | Armangau et al. |
| 9,378,106 B1 | 6/2016 | Ben-Moshe et al. |
| 9,384,206 B1 | 7/2016 | Bono et al. |
| 9,395,937 B1 | 7/2016 | Si et al. |
| 9,396,243 B1 | 7/2016 | Halevi et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 2009/0313311 A1* | 12/2009 | Hoffmann ........... G06F 11/2094 |
| 2011/0106763 A1* | 5/2011 | Madan ................. G06F 16/178 |
| | | 707/639 |
| 2016/0004721 A1* | 1/2016 | Iyer ...................... G06F 16/184 |
| | | 707/649 |
| 2017/0242599 A1* | 8/2017 | Patnaik ............... G06F 11/1662 |
| 2018/0096045 A1* | 4/2018 | Merriman ............. G06F 16/273 |
| 2019/0303009 A1* | 10/2019 | Meiri .................... G06F 3/067 |
| 2019/0303010 A1* | 10/2019 | Meiri .................... G06F 3/0605 |

OTHER PUBLICATIONS

T. Nayak, R. Routray, A. Singh, S. Uttamchandani and A. Verma, "End-to-end disaster recovery planning: From art to science," 2010 IEEE Network Operations and Management Symposium—NOMS 2010, Osaka, 2010, pp. 357-364.*
U.S. Appl. No. 15/656,168, filed Jul. 21, 2017, Hu et al.
U.S. Appl. No. 16/042,363, filed Jul. 23, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/038,543, filed Jul. 18, 2018, Chen et al.

* cited by examiner

ONLINE ITERATIVE DATA VERIFICATION FOR SYNCHRONOUS REPLICATION

BACKGROUND

Synchronous (sync) replication is a business continuity process that mirrors data updates between two systems to prevent data loss and downtime. When sync replication is turned on for a production storage object, the system mirrors the data to a target system as part of handling write requests from an initiator, and only responds to the initiator after the writes have been persisted on both the source and target systems.

As data on the source and target sites are inherently different with ever changing inflight inputs/outputs (IOs), it is challenging to perform data verification for volumes that are in active sync replication mode. One solution is to suspend host IOs followed by draining the inflight IOs to create a pair of synchronized snap sets when the sync replication process becomes enabled. However, the period of suspending and draining IOs and creating snap sets may cause major IO latency hiccups for applications, which may not be practical or desirable in real customer environments where steady/low IO latency requirements are critical.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to provide online iterative data verification for synchronous replication between a source site and a target site. The method includes, during an active synchronous replication process between the source site and the target site, identifying inflight inputs/outputs (IOs). The inflight IOs indicate write operations that are transmitted from the source site to the target site but are determined to have not yet been stored at the target site. The method further includes performing a first data verification on the source site and the target site. The first data verification is performed for IOs that are not inflight IOs. The method also includes performing iterative data verifications during each of one or more replication cycles. The iterative data verifications verify only data written to the target site since one of the first data verification and a previously performed data verification excluding inflight IOs at the time of verification.

Another aspect may provide a system for providing online iterative data verification for synchronous replication between a source site and a target site. The system includes a memory having computer-executable instructions. The system also includes a processor operated by a storage system. The processor executes the computer-executable instructions. When executed by the processor, the computer-executable instructions cause the processor to perform operations. The operations include, during an active synchronous replication process between the source site and the target site, identifying inflight inputs/outputs (IOs). The inflight IOs indicate write operations that are transmitted from the source site to the target site but are determined to have not yet been stored at the target site. The operations further include performing a first data verification on the source site and the target site. The first data verification is performed for IOs that are not inflight IOs. The operations also include performing iterative data verifications during each of one or more replication cycles. The iterative data verifications verify only data written to the target site since one of the first data verification and a previously performed data verification excluding inflight IOs at the time of verification.

Another aspect may provide a computer program product embodied on a non-transitory computer readable medium. The computer program product includes instructions that, when executed by a computer at a storage system, causes the computer to perform operations. The operations include, during an active synchronous replication process between a source site and a target site, identifying inflight inputs/outputs (IOs). The inflight IOs indicate write operations that are transmitted from the source site to the target site but are determined to have not yet been stored at the target site. The operations further include performing a first data verification on the source site and the target site. The first data verification is performed for IOs that are not inflight IOs. The operations also include performing iterative data verifications during each of one or more replication cycles. The iterative data verifications verify only data written to the target site since one of the first data verification and a previously performed data verification excluding inflight IOs at the time of verification.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1A:
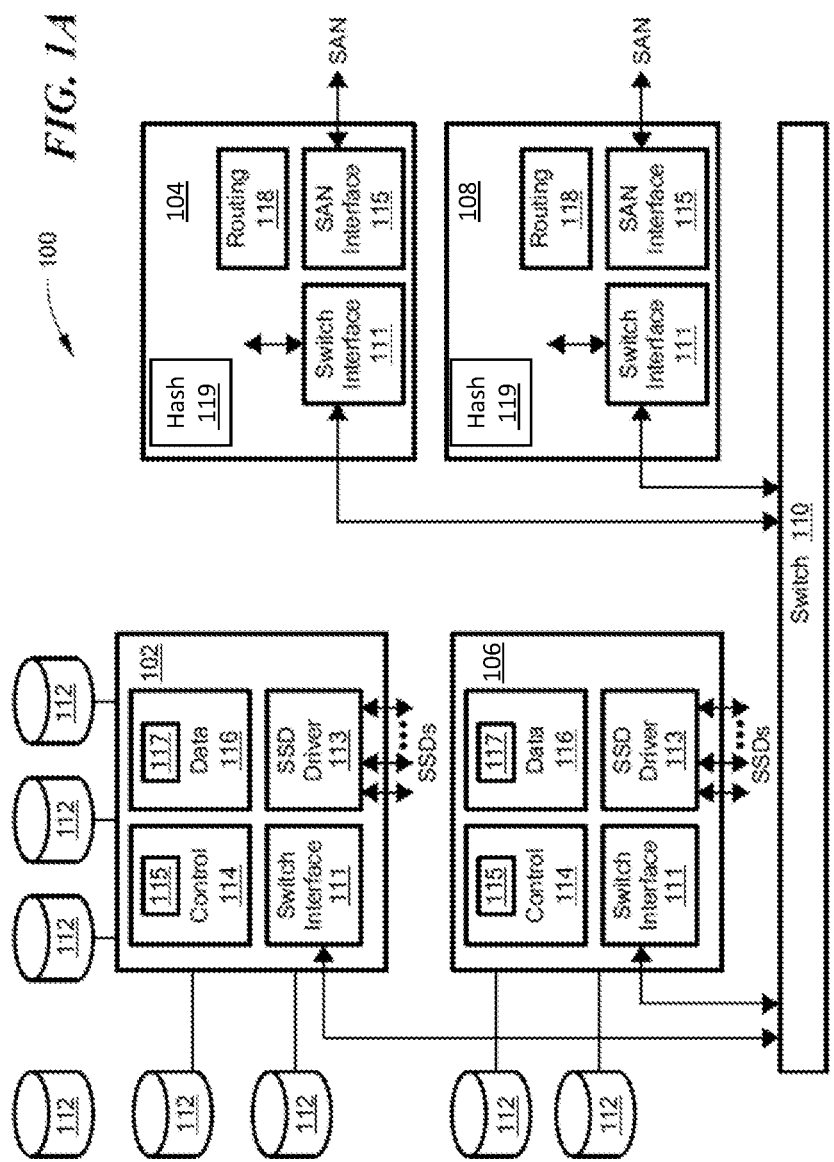
FIG. 1A is a block diagram of a content-based storage system having multi-level cache for deduplicated storage for providing online iterative data verification for synchronous replication in an embodiment.

Embodiments described herein provide online iterative data verifications for synchronous replication between a source site and a target site. In embodiments, a dirty tree of snap sets and production volumes are utilized to eliminate the impact of inflight IOs during verification without suspending and draining host IOs.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "IO request" or simply "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., IO data) issued to a storage system, which may be used to maintain a duplicate storage system, and to roll back the duplicate storage system to a previous point in time. In some embodiments, each entry in a journal contains, apart from the IO data itself, IO metadata that can include information such as a volume identifier (ID), the IO block offset within the volume, the IO length, and a time stamp of the IO.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having IO interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data. In an exemplary Content Addressable Storage (CAS) array (e.g., as described in U.S. Pat. No. 9,208,162 (hereinafter "'162 patent"), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it can be faster to send the data without a hash signature, and let the target calculate the hash signature.) While the hash handles are readily available without the need to read from Flash, since the hash handles are not unique, they cannot be easily used to check if a target contains a hash signature. In some implementations, hash handles are shortcuts for hash signatures, and can give a reliable hint of the existence of a hash signature in an array.

In embodiments, data verification in a replication storage environment scans data between a source and target system and checks the data for accuracy and inconsistencies and to determine whether the data has been completely transferred from the originating system to the receiving system.

In embodiments, a snap set may be defined as a group of snapshot volumes that are created at certain point in time. The system ensures data consistency among the snap shot volumes within the same snap set.

It is envisioned that at least some embodiments herein are usable with embodiments described in commonly owned U.S. Pat. No. 9,104,326 ("Scalable Block Data Storage Using Content Addressing") (hereinafter "'326 patent"), which is hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 119 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 104.

The routing systems 118 may use the hash values calculated from data blocks to select control systems 114 for distribution. More particularly, selection of the control system 114 may use hash values or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/ erase cycle limitations of the various memory technologies.

Figure 1B:
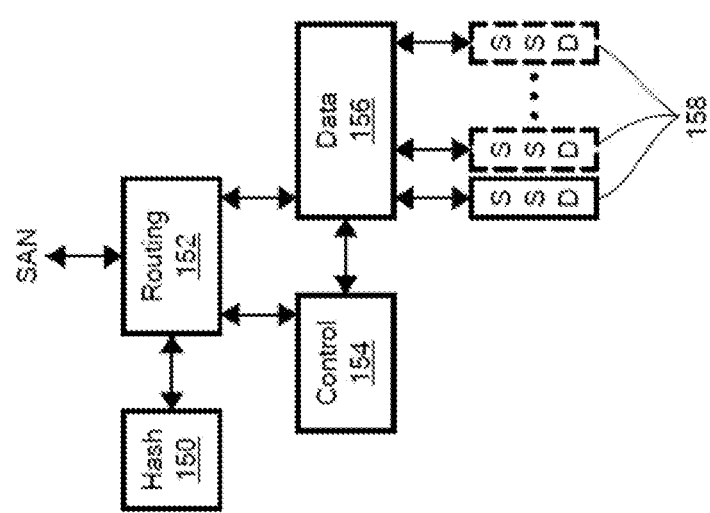
FIG. 1B illustrates further detail of the system of FIG. 1A.

FIG. 1B is an example of a system that can include a hash (H) system 150 communicatively coupled to a routing (R) system 152, which can be communicatively coupled to a control (C) system 154 and a data (D) system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

A function of the H module 150 is to calculate the Hash function value for a given block of data, e.g., data which is the subject of storage commands. The hash values calculated may later be used for retrieval. The Hash function may be based on standards based hash functions such as SHA-1 and MD5, or based on a proprietary function, but this is not limiting. The hash function is selected, in certain embodiments, to generate a uniformly distributed output over the range of potential input values. In certain embodiments, H modules 150 share nodes with an R module 152, but that is not limiting. More generally, the H modules 150 can reside in certain nodes, in all nodes, together with R modules 152, or together with C modules 154 or D modules 156.

A function of the R module 152 is to terminate storage area network (SAN) Read/Write commands and route them to appropriate C and D modules 154 and 156, for execution by these modules. By doing so, the R module 152 can distribute workload over multiple C and D modules 154, 156, and at the same time create complete separation of the Control and Data planes, that is to say provide separate control and data paths. In certain embodiments, the R module 152 routes small computer system interface (SCSI) IO request to the C modules 154, guarantees execution, and returns the result. In certain embodiments, the R module 152 maintains an up to date data structure called an address-to-control module (A→C or A2C) table, coordinated with the management back end (MBD), indicating which C module 154 is responsible for each logical X-page address (LXA), and also showing a balance a range of all possible LXAs between available C modules 154. In certain embodiments, for write operations, the R module 152 instructs the calculation of a hash digest for each X-page by requesting such calculation from a hash calculation module (e.g., the H module 150).

A function of the C module 154 is to control the execution of a Read/Write (R/W) command, as well as other storage functions implemented by the system. The C module 154 also may maintain and manage key metadata elements. In certain embodiments, the C module 154 receives an IO request from an R module 152 on a certain sub-LUN (SL), guaranteeing its atomic execution (i.e., execution independent of other processes) and returns the result to the R module 152. The C module 154 also communicates with D modules 156 to execute the IO requests. In addition, the C module 154 monitors the disk content of its logical space by associating each LXA with its hash digest; and balances the work load between the D modules for the SLs that the C module 154 is maintaining. The C module 154 and data module 156 each maintains certain data structures and corresponding metadata journals for those data structures. For example, the C module 154 maintains an "address to hash" table (A2H table, also referred to herein as A→H table) and corresponding A2H metadata journal, in the C module 154. The D module 156 maintains the "hash to physical location of data" table (H2P table, also referred to herein as H→P table) and its corresponding metadata journal in the D module 156. That is, in certain embodiments, the in-memory copy of a journal is in the same module as the corresponding metadata table. In certain embodiments, the on-disk journal copy is persisted and mirrored across nodes in the cluster in journal disk chunks.

The A2H table maps each LXA that belongs to the SLs that the C module 154 is responsible for, to the hash digest representing the X-page Data that currently resides in that address. The C module 154 maintains an A2H table in a persistent way. The C module 154 may initiate requests to D modules 156 in order to save table pages to disk and read them from disk. In addition, to avoid frequent disk operations, the C module 154 maintains a journal certain of the latest table operations. These journals include (but are not limited to) the A2H metadata journals (A2H Hash tree) and dirty tree update metadata journals. The dirty tree and corresponding functionality are described further in commonly assigned U.S. patent application Ser. No. 15/656,168 entitled "Online Metadata Backup Consistency Check," filed on Jul. 21, 2017, which is hereby incorporated by reference.

The data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals. For example, in certain embodiments, the metadata journals include information associated with time-based changes to information in the respective A2H and H2P tables and time-based changes to the disk block allocation bitmap.

The H2P table maps each range of hash digests to the corresponding D module 156 responsible for that range. The H2P table balances the range of all possible hash digests between the available D modules 156.

A function of the D module 156 is to perform the actual read/write (R/W) operation by accessing the storage devices 158 attached to it. The D module 156 may maintain metadata related with the physical location of data blocks. In certain embodiments, the D module 156 is responsible for: maintaining a set of LUNs which are attached locally and performing all IO operations on these LUN; managing the physical layout of the attached LUNs; managing the mapping between X-Page Data hash digests and their physical location in a persistent way; managing deduplication of X-Page Data in a persistent way; and receiving disk IO requests from C modules 154, perform them and returning a result.

In certain embodiments, the D module 156 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 156 maintains an up-to-date H→(D, $D_{backup}$) table coordinated with the MBE, where the H→(D, $D_{backup}$) table is expected to balance the range of all possible hash digests between the available D modules 156.

Balancing between the D modules is based on hashing of the content. For example, in certain embodiments, the D module 156 makes use of a hash digest metadata table. The hash digest meta data table maps each in use hash digest, that represents actual X-Page Data, to its meta data information including its physical page on the storage media (SSD), its memory copy (if exists), a mapping to any backup memory copy and a reference count for the purpose of deduplication. The D modules 156 manage a separate nonvolatile memory pool (NVRAM or UPS protected) for X-Page Data backup purposes. The backup holds X-Pages that are held in memory of the D primary and have not yet been destaged. This is an example of the user data destage cache (UDC). There are dirty X-pages waiting to be persisted on disk. When re-balancing between D modules 156 occurs (due to a D module 156 failure for example), the D module 156 may communicate with other D modules 156 in order to create new backup copies or move a primary ownership as required.

The D modules 156 allow deduplication per X-Page Data by maintaining a persistent reference count that guarantees only one copy per X-Page Data. The D modules 156 manage the hash digest metadata table in a persistent way. The table is coordinated with the physical layout for physical pages allocation, with the memory pointer, memory backup pointer, and deduplication reference count.

As will be appreciated, the R, C, D, and H modules 150-156 may be implemented in software, and executed on a physical node. In addition, the aforementioned '326 patent provides information relating to additional functionality of the R, C, D, and H modules 150-156, in certain embodiments.

Figure 2:
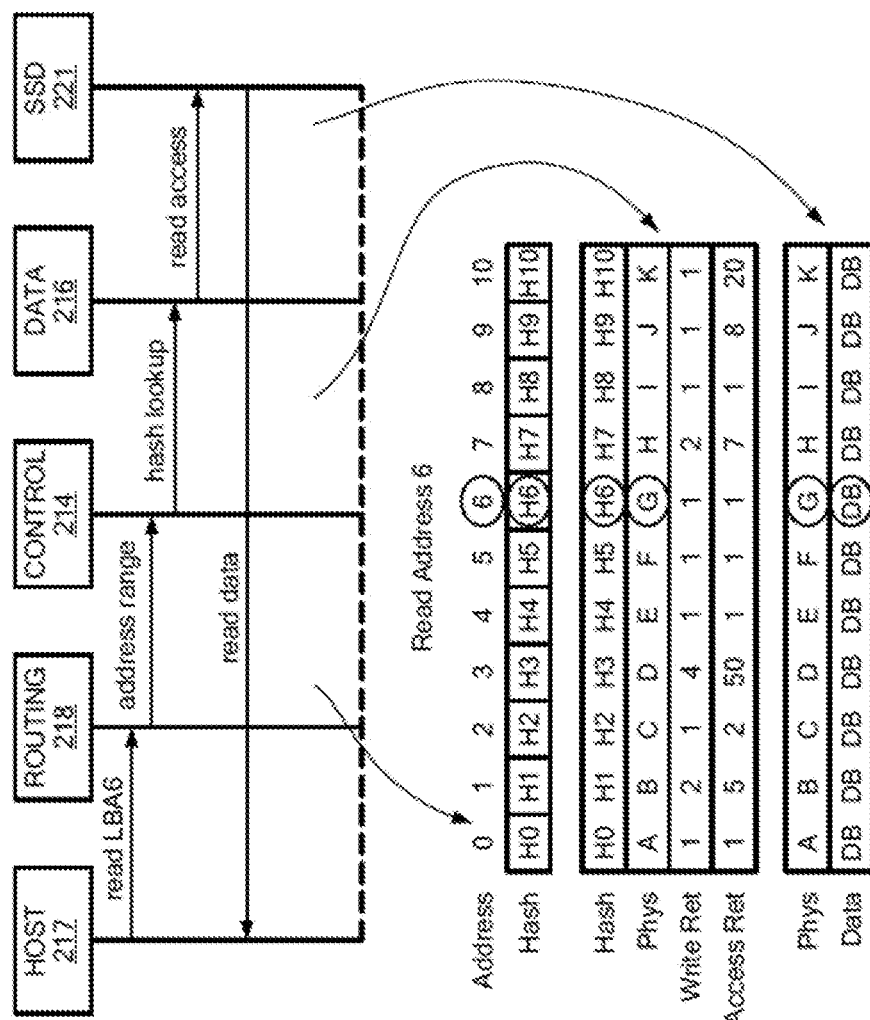
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented.

If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
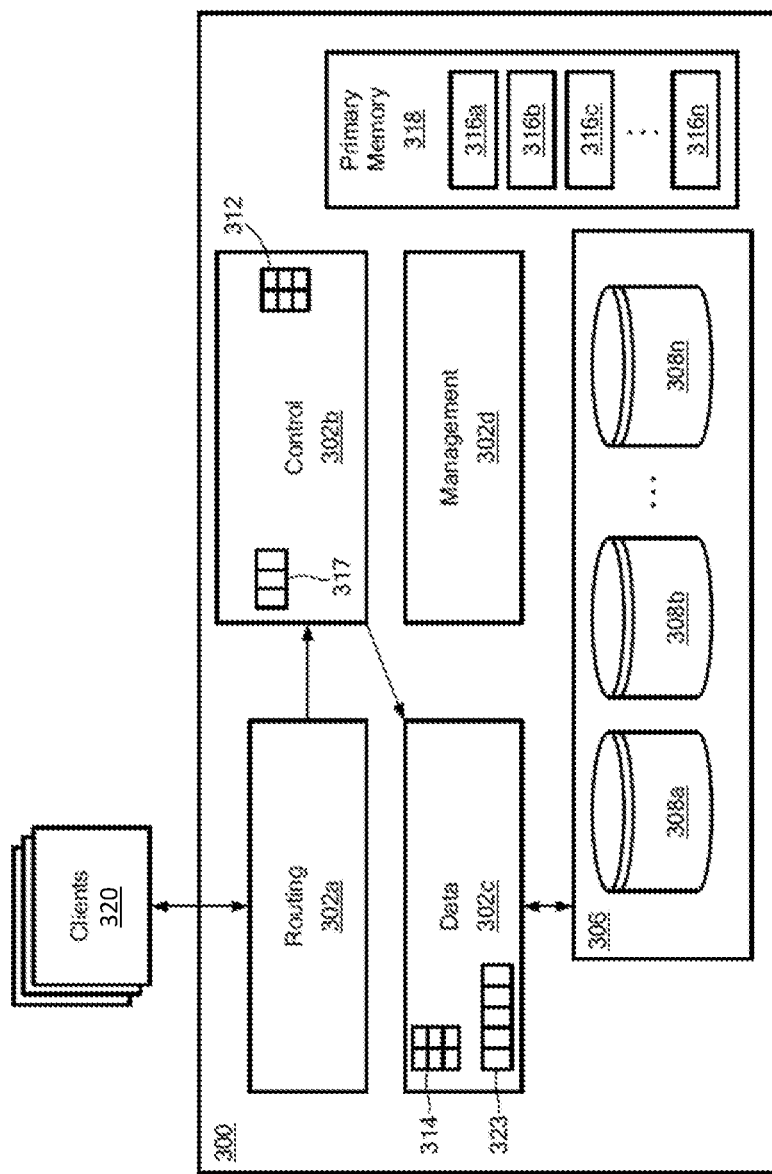
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between IO addresses associated with data and the corresponding chunk hashes. As shown in FIG. 3, this mapping may be maintained using a data structure 312, referred to herein as an "IO address to chunk hash mapping table" or "A2H table," (also known as A→H table) according to some embodiments. In one embodiment, IO addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data.

In embodiments, meta data can include for each address the hash value of the content. If the basis for deduplication is 16 KB, then the meta data holds for each address the short hash value of the data to which the address points. In cases where access to the volume is in larger chunks than the size of the basic hash value, the meta data for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the meta data of the hash from the disk to verify if such a hash exists. It will be appreciated that meta data structures may consume most of system memory, e.g., DRAM, in the storage system, so that the meta data limits the total size of the storage system.

Figure 4:
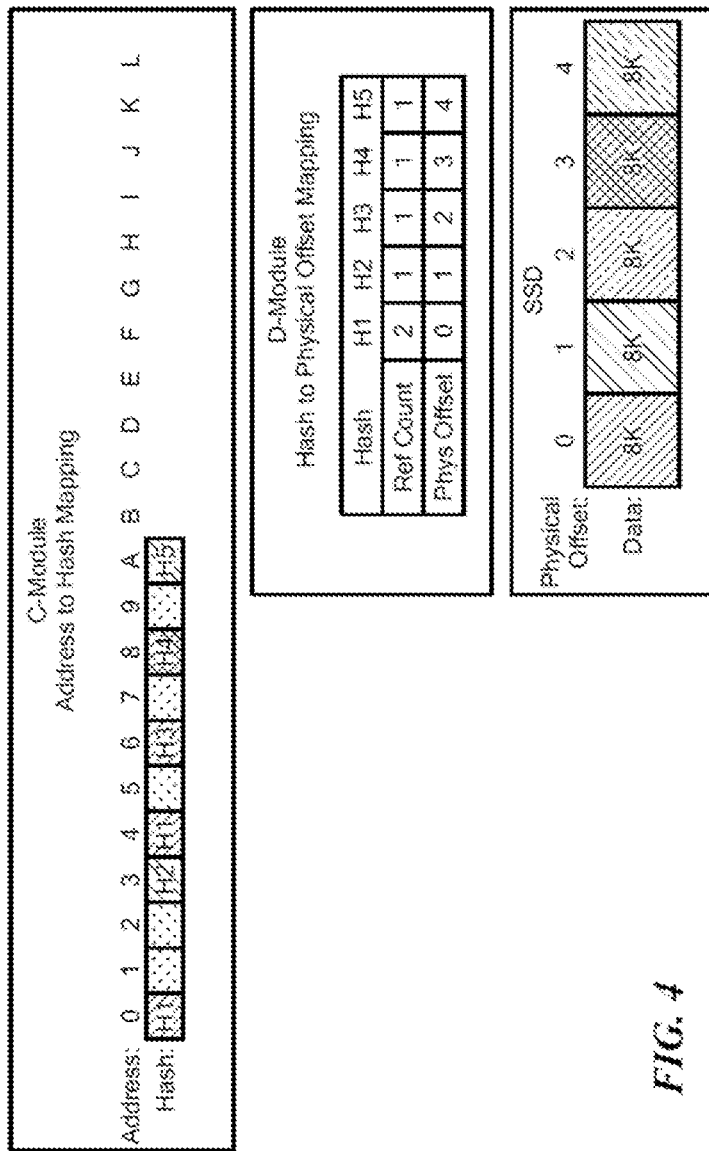
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

Figure 5:
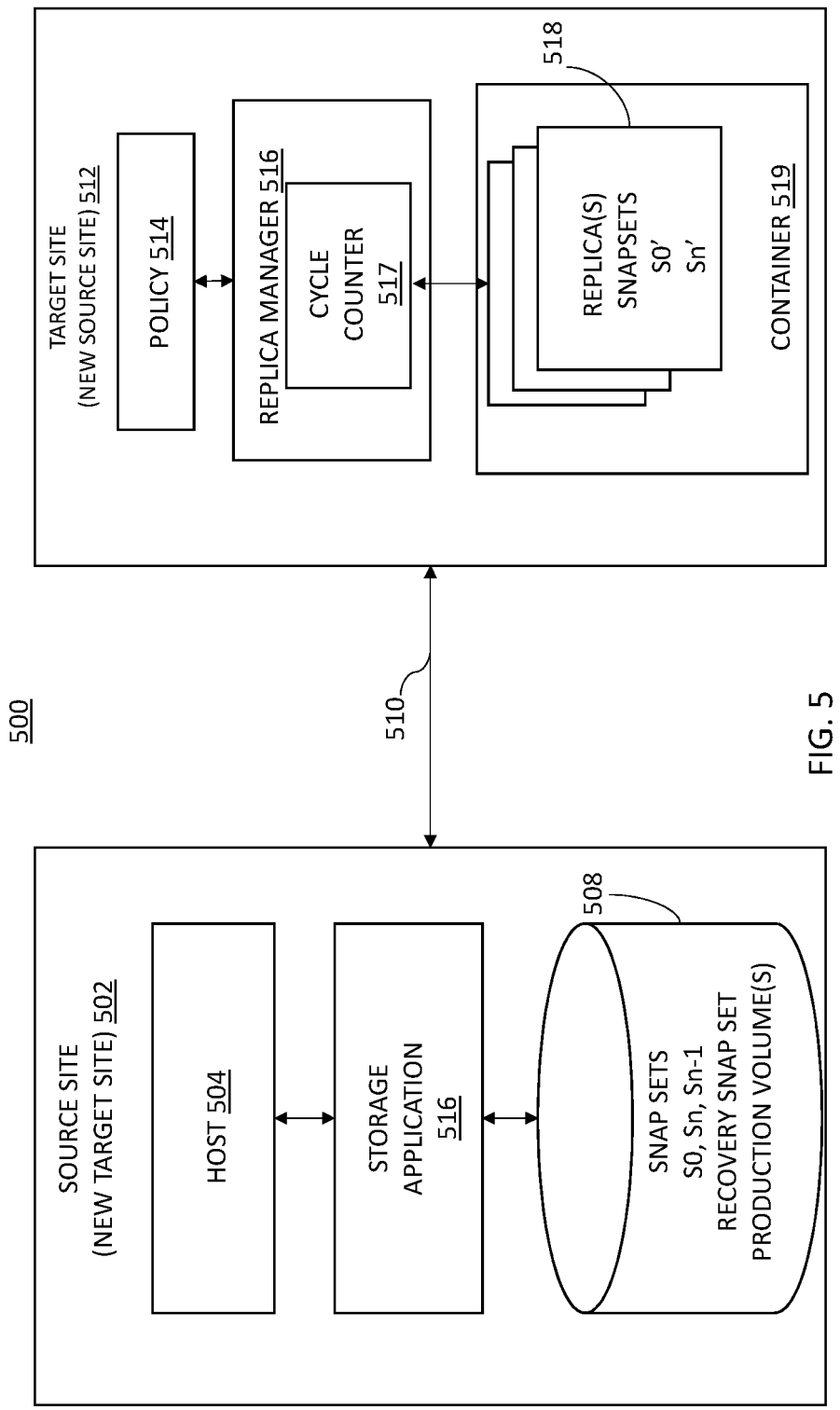
FIG. 5 is a simplified block diagram of a replication system for providing online iterative data verification for synchronous replication in accordance with an embodiment.

Turning now to FIG. 5, an example storage system 500 for performing online iterative data verification for synchronous replication will now be described. Storage system 500 may include at least one source site 502 and at least one target site 512. In an embodiment, target site 512 is either co-located with source site 502 or is in close geographic proximity (e.g., within the same building or building complex) with the source site 502. In other embodiments, target site 512 is remotely located from the source site 502. For example, target site 512 may be geographically dispersed across cities, states, or even countries with respect to source site 502.

Source site 502 may include a host 504, storage application 506, and data storage 508. In some embodiments, storage 508 may include one or more storage volumes (e.g., production volumes), that operate as active, or production, volumes.

Host 504 may perform IO operations on storage 508 (e.g., read data from and write data to storage 508). In some embodiments, the IO operations may be intercepted by and controlled by the storage application 506. As changes are made to data stored on storage 508 via the IO operations from host 504, or over time as storage system 500 operates, storage application 506 may perform data replication from the source site 502 to the target site 512 over a communication network 510. In some embodiments, the communication network 510 may include internal (e.g., short distance) communication links (not shown) to transfer data between storage volumes for storing replicas 518 (also referred to herein as snap sets), such as an InfiniBand (IB) link or Fibre Channel (FC) link. In other embodiments, the communication link 510 may be a long-distance communication network of a storage area network (SAN), e.g., over an Ethernet or Internet (e.g., TCP/IP) link that may employ, for example, the iSCSI protocol.

In illustrative embodiments, storage system 500 may employ a snap set (or replication) mechanism to replicate data between source site 502 and target site 512. A snap set (or replica) may be created from data within storage 508 and transferred to the target site 512 during a data replication cycle by data replication.

Data replication may be performed based on data replication policies that may define various settings for data recovery operations, shown as policy 514 in target site 512. For example, policy 514 may define a plurality of attributes, such as a frequency with which replicas are generated and how long each replica 518 is kept at target site 512. In some embodiments, policy 514 defines metrics for use in snap set creation and replication process determinations.

As described herein, in example embodiments, data replication refers to synchronous data replication with snap sets created in dynamic intervals during operation of storage system 500. The timing of synchronous replication cycles and the retention of the replicas 518 may be managed by replica manager 516 of target site 512.

In addition to managing replicas 518 according to a policy 514 (e.g., a replication and/or retention policy), the replica manager 516 may also include a cycle counter 517 to track generations of snap sets over time.

It will be understood that the roles of the source site 502 and the target site 512 may be reversed in instances, e.g., in which an event occurring on the source site 502 causes the target site 512 to intercept IOs and take on the role of snap set creation and replication to the source site. This role reversal is referred to as a failover event. In this manner, the processes described herein apply equally to the target site. In this instance, the source site 502 becomes the new target site, and the target site 512 becomes the new source site, as shown in FIG. 5.

As indicated above, synchronous replication is a business continuity process that mirrors data updates between two systems to prevent data loss and downtime. When sync replication is turned on for a production storage object, the system mirrors the data from source to target system as part of handling write requests from initiator and only responds to initiator after the writes have been persisted on both source and target system.

As data on the source and target sites are inherently different with ever changing inflight IOs, it is challenging to perform data verification for volumes in active sync replication. Inflight IOs indicate write operations that are incomplete (e.g., transmitted from the source site to the target site but are determined to have not yet been stored at the target site). The embodiments described herein provide for iterative data verification utilizing a dirty tree of snap sets and production volumes. This eliminates the impact of inflight IOs during verification without suspending and draining host IOs. The embodiments provide a mechanism in which inflight IOs are skipped at the time of verification and multiple rounds of verification are performed until an entire data address space is covered. In embodiments, the process may utilize XtremIO snap set technology to calculate changes in the data since the beginning of the verification process.

Figure 6:
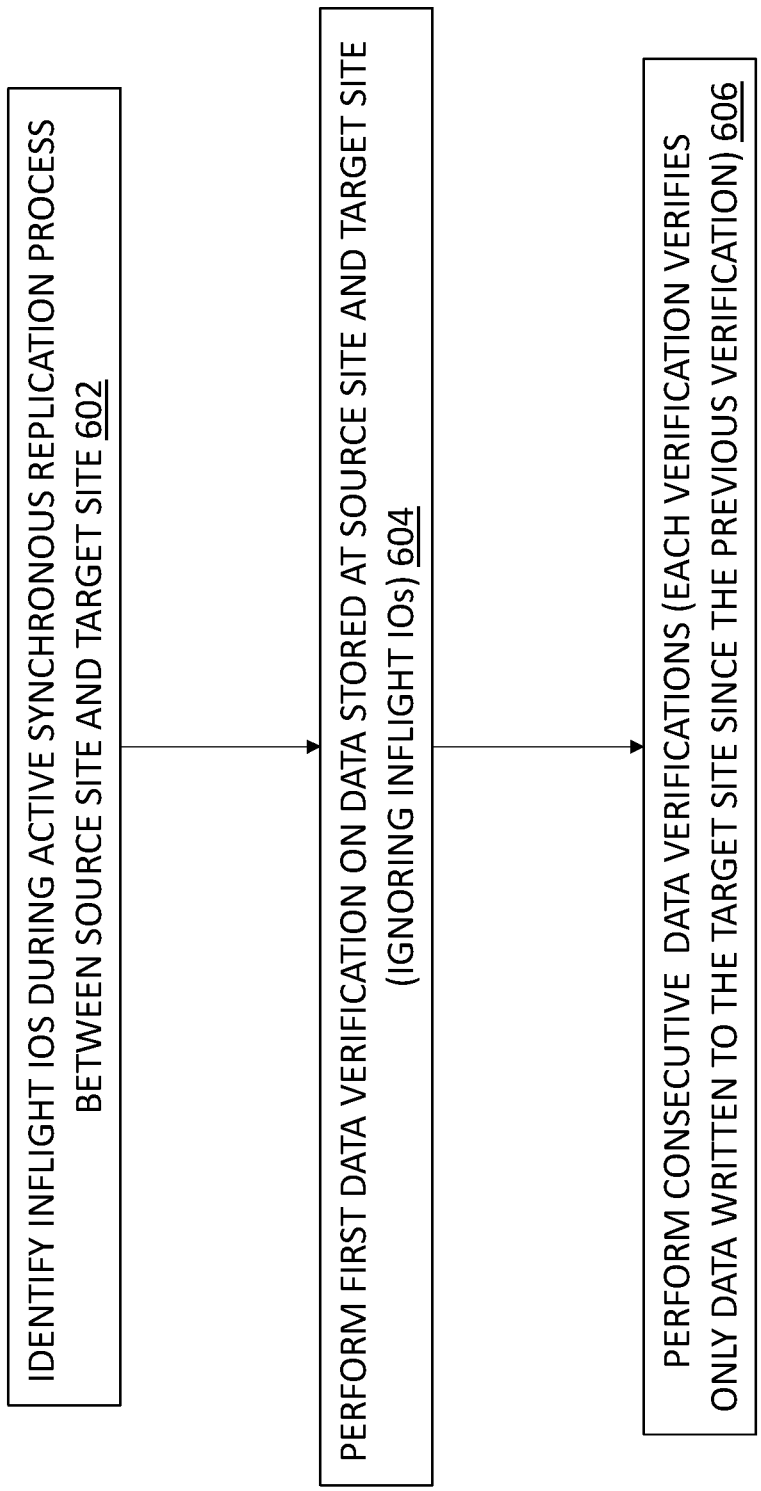
FIG. 6 is a flow diagram of a process for providing online iterative data verification for synchronous replication in accordance with an embodiment.

Turning now to FIG. 6, a process 600 for providing online iterative data verification for sync replication will now be described. The process assumes that a user has issued a verification request on an active sync replication session. The active sync replication session may be implemented, by way of non-limiting example, on the replication system 500 shown in FIG. 5.

In block 602, inflight IOs are identified during the active synchronous replication process between the source site and the target site. As indicated above, the inflight IOs indicate write operations that are incomplete (e.g., transmitted from the source site to the target site but are determined to have not yet been stored at the target site. In embodiments, the identification of the inflight IOs are further described in FIG. 7.

In block 604, the process 600 performs a first data verification on the source site and the target site. The first data verification is performed only for IOs that are not inflight (e.g., the IOs that are persisted on the target site). In embodiments, the first data verification is further described in FIG. 8.

In block 606, the process 600 performs iterative data verifications during each of one or more replication cycles. In each iterative data verification (following the first data verification), the verification verifies only the data that is written to the target site since the previous data verification. In embodiments, the iterative data verifications are further described in FIG. 9.

Figure 7:
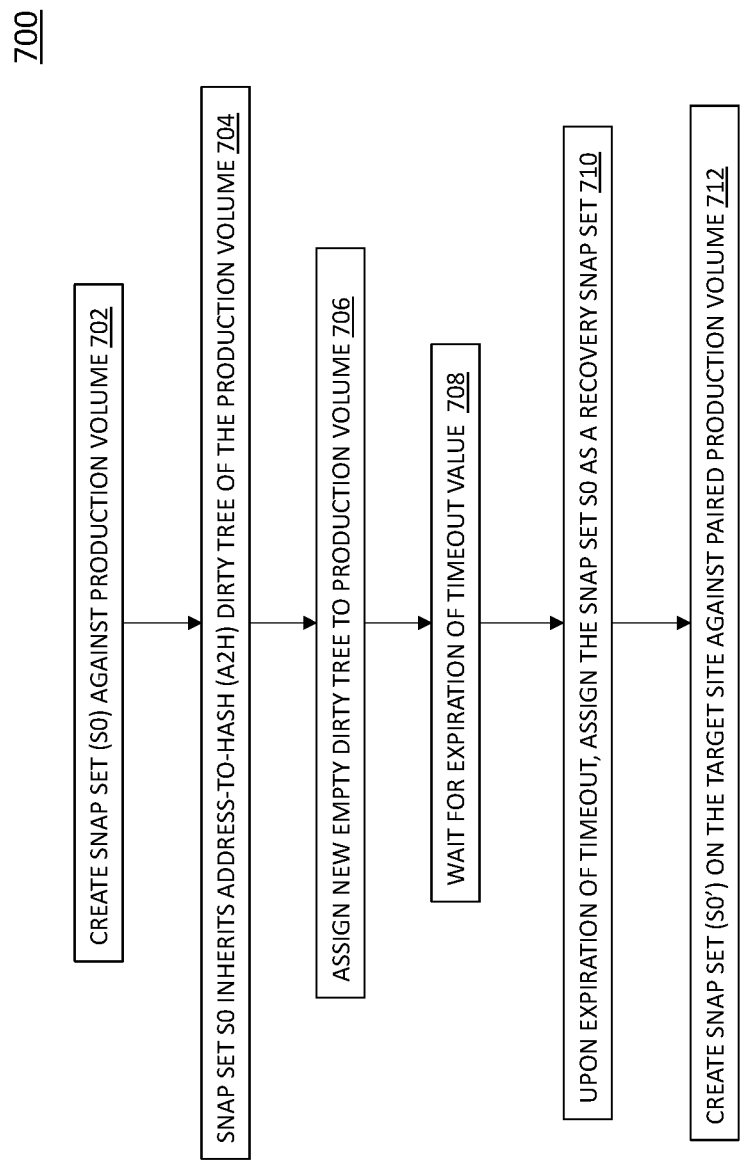
FIG. 7 is a flow diagram of a process for identifying inflight input/outputs (IOs) during an active synchronous replication process in accordance with an embodiment.

Turning now to FIG. 7, a process 700 for identifying the inflight IOs will now be described. In block 702, the process 700 creates a snap set (S0) against a production volume of the source site. The snap set S0 is created as a base for performing the first data verification.

In block 704, the process 700 causes the snap set S0 to inherit an address-to-hash (A2H) dirty tree of the production volume. In block 706, the process 700 assigns a new empty dirty tree to the production volume.

In block 708, the process 700 waits for the expiration of a timeout period to make sure that all the data in S0 has been transferred to the target site. Once the timeout period has expired, the process 700 provides for the snap set S0 to become a recovery snap set for use in sync replication fast recovery. The timeout value and the recovery snap set will now be described. In some types of storage systems, such as XtremIO, it is known that a snap set may be used in a sync replication if it is created earlier than a maximum defined IO timeout value, e.g., 30 seconds, which may be a storage system default value or a user-configurable value. In applying this IO time value of 30 seconds, by way of illustration, and given a system designed to guarantee that all IOs are served within the maximum timeout value, if a snap set is created on the source system 30 seconds ago, then all data that are saved in this snap set must also be completed on the target system. Similarly, if a snap set is created on the target system 30 seconds ago, it is determined that data save in the snap set are also saved on the source. If snap sets are periodically created during sync replication, at the time of failover, the process finds a snap set that is created 30 second prior to the time of failover. That snap set can then be used for recovery after failover. This holds true regardless of whether the replication writes complete on the source first or on the target first. The snap set is referred to as a recovery snap set and is further described in commonly assigned U.S. Patent Publication No. 2020-0026627 A1, filed on Jul. 23, 2018, entitled "Method to Support Synchronous Replication Failover," the contents of which are incorporated herein in its entirety.

Returning now to FIG. 7, upon expiration of the timeout, the snap set S0 is assigned as a recovery snap set in block 710. In block 712, the process 700 creates a snap set (S0') on the target site against paired production volume. A paired production volume refers to a matching pair of two volumes, one at replication source, and one at replication target. All data changes to a replication source volume are eventually replicated to the paired replication target volume.

Figure 8:
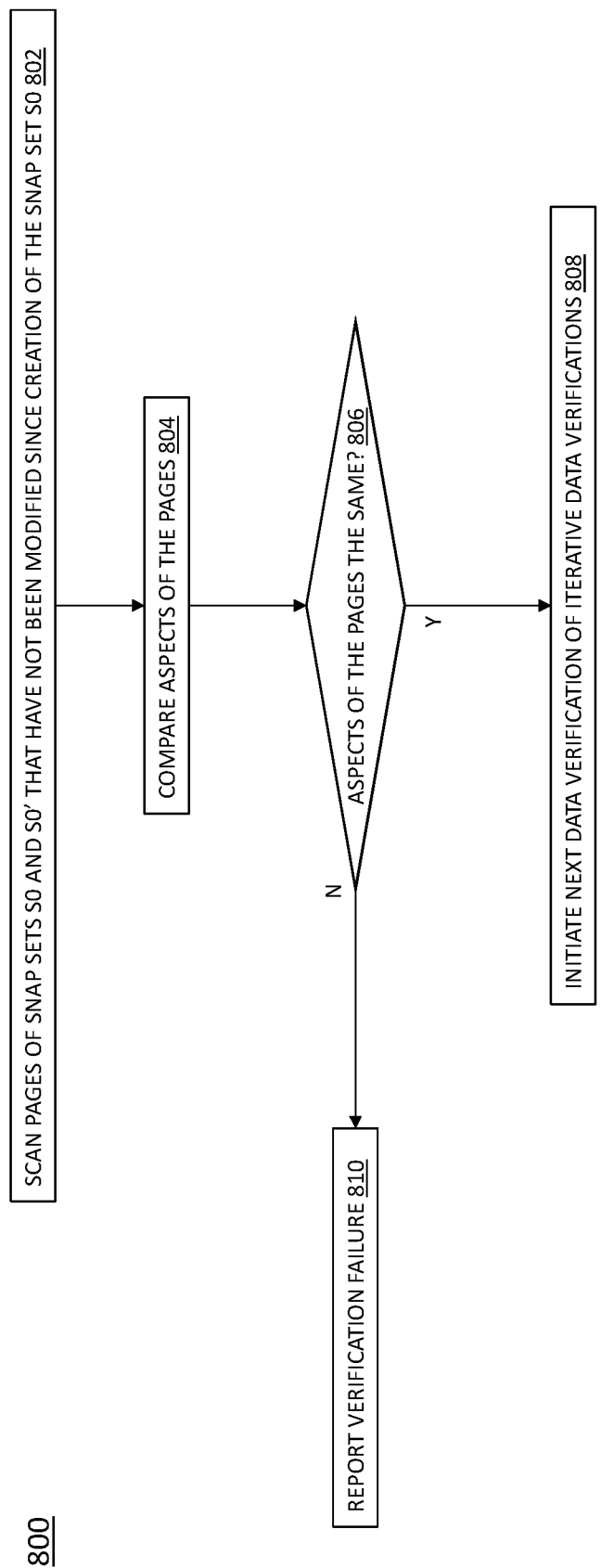
FIG. 8 is a flow diagram of a process for performing an initial data verification on data stored at a source site and a target site in accordance with an embodiment.

Turning now to FIG. 8, a process 800 for implementing the first data verification (from FIG. 6, block 604), will now be described. In block 802, the process 800 scans pages of snap sets S0 and S0' that have not been modified since creation of the snap set S0. In block 804, the process 800 compares aspects of the pages and at block 806, it is determined whether the aspects from the pages are the same. If so, in block 808, the next (iterative) data verification may be implemented. Otherwise, in block 810, the process 800 reports that the verification has failed (e.g., the data is inconsistent between the source and target sites).

In embodiments, the scanning of the pages that have not been modified since creation of the snap set S0 (from block 802) may be implemented by obtaining page offsets and hashes of valid pages in the snap set volumes from the snap set S0, skipping pages that have been updated on the production volume since creation of the snap set S0. The process 800 then issues a remote read hash command to the snap set S0' from a remote system based on the page offsets. Comparing aspects of the pages may be implemented by comparing each of the page offsets and their corresponding hash values.

Figure 9:
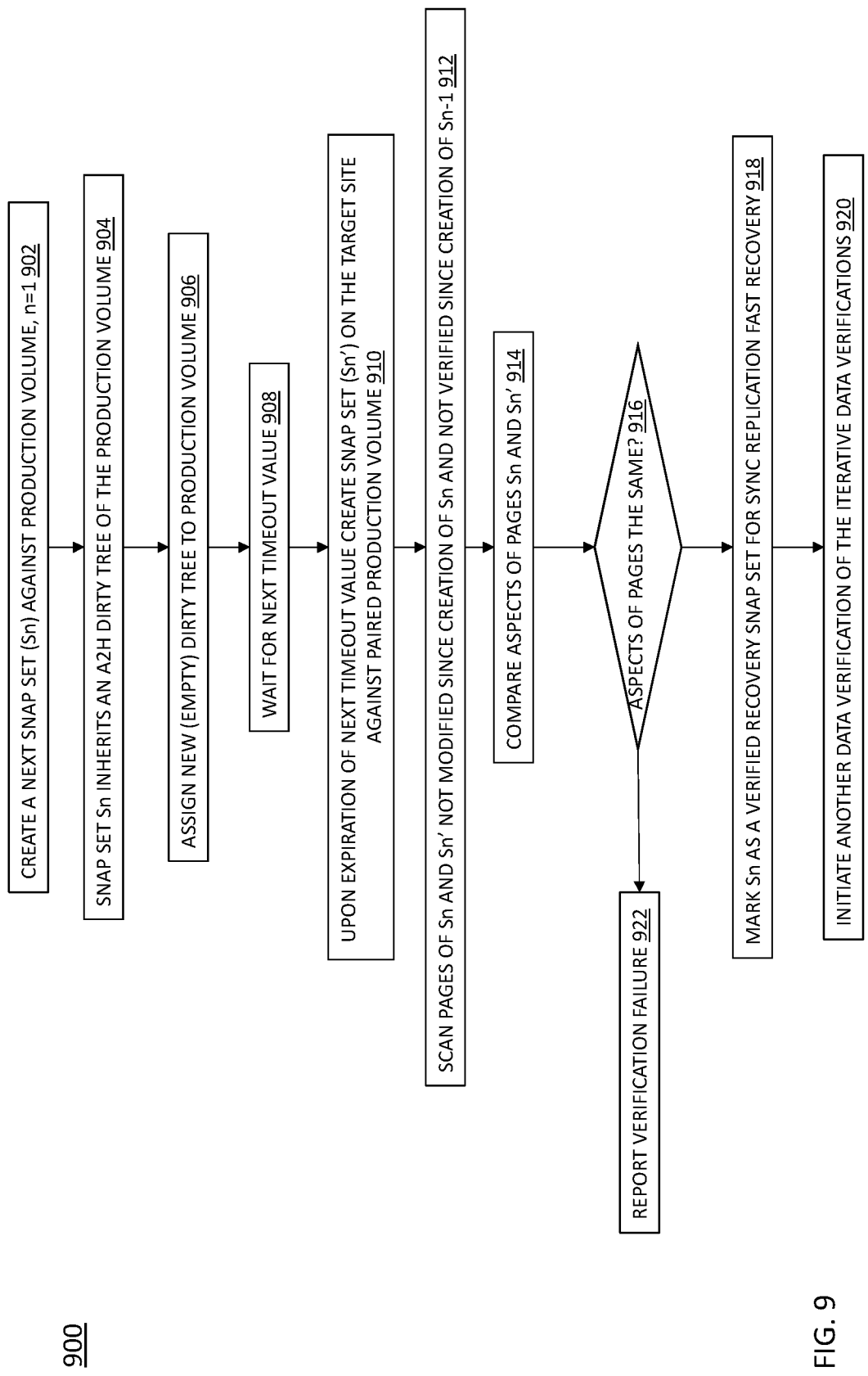
FIG. 9 is a flow diagram of a process for performing iterative data verifications on data stored at a source site and a target site in accordance with an embodiment.

Turning now to FIG. 9, a process 900 for performing iterative data verifications (block 606 of FIG. 6) will now be described. In block 902, the process 900 creates a next snap set (Sn) against the production volume, where n=1.

Upon creating the next snap set Sn against the production volume, the snap set Sn inherits the A2H dirty tree of the production volume in block 904. The process 900 assigns a new empty dirty tree to the production volume in block 906.

In block 908, the process waits for a next timeout. Upon an occurrence of the next timeout, the process 900 creates a snap set (Sn') on the target site against paired production volume in block 910.

In block 912, the process 900 scans pages of the snap sets Sn and Sn' that have not been modified since the creation of the Sn and have not been verified since creation of Sn−1. In block 914, the process 900 compares aspects of the pages Sn and Sn' and the process 900 determines whether the aspects of the pages are the same in block 916. If the aspects are the same, the snap set Sn is marked as a verified recovery snap set in block 918. The marking indicates that the snap set Sn is configured for use in synchronous replication fast recovery.

In block 920, the process 900 initiates a next data verification of the iterative verifications, where n=n+1. If, however, the aspects of the pages are not the same in block 916, the process 900 reports a verification failure in block 922.

The process described in block 912 may be implemented, for example, by obtaining page offsets on an aggregated dirty tree between snap sets Sn and Sn−1 that marks pages written between creation of Sn and Sn−1, and retrieving the hash handles of the pages skipping pages that are on the new dirty tree.

Figure 10:
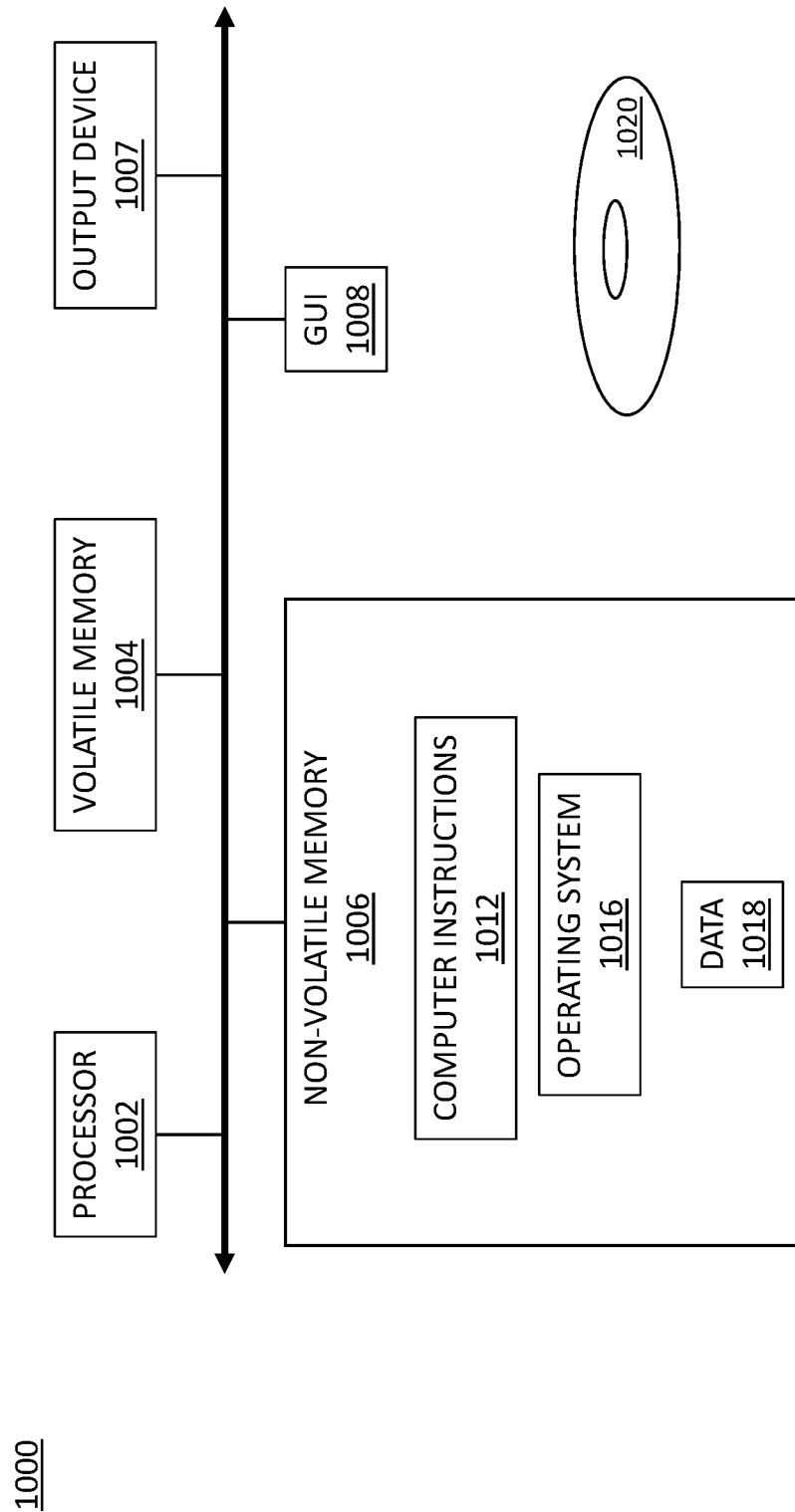
FIG. 10 is a block diagram of an illustrative computer that can perform at least a portion of the processing described herein.

FIG. 10 shows an exemplary computer 1000 (e.g., physical or virtual) that can perform at least part of the processing described herein. The computer 1000 includes a processor 1002, a volatile memory 1004, a non-volatile memory 1006 (e.g., hard disk or flash), an output device 1007 and a graphical user interface (GUI) 1008 (e.g., a mouse, a keyboard, a display, for example). The non-volatile memory 1006 stores computer instructions 1012, an operating system 1016 and data 1018. In one example, the computer instructions 1012 are executed by the processor 1002 out of volatile memory 1004. In one embodiment, an article 1020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for online iterative data verifications for synchronous replication at a storage system including a source site and a target site, comprising:

during an active synchronous replication process between the source site and the target site, performing:

identifying inflight inputs/outputs (IOs), comprising:

creating a snap set (S0) against a production volume, the snap set S0 created as a base for a first data verification; and upon expiration of a timeout value, the timeout value specifying a maximum amount of time that can elapse before a snap set created at the source site must be saved at the target site, assigning the snap set S0 as a recovery snap set, and creatin a snap set (S0') on the target site against paired production volume;

performing the first data verification on the source site and the target site, the first data verification performed for IOs that are not inflight IOs; and performing iterative data verifications during each of one or more replication cycles, the iterative data verifications verifying only data written to the target site since one of the first data verification and a previously performed data verification excluding inflight IOs at the time of verification.

2. The method of claim 1, wherein:

the inflight IOs indicating write operations that are transmitted from the source site to the target site but are determined to have not yet been stored at the target site; and wherein the first data verification comprises scanning pages of snap sets S0 and S0' that have not been modified since creation of the snap set S0, comparing aspects of the pages, and upon determining the aspects of the pages are the same, initiating a next data verification of the iterative data verifications.

3. The method of claim 2, wherein upon creating the snap set S0 against the production volume, the snap set S0 inherits an address-to-hash (A2H) dirty tree of the production volume, the method further comprising assigning a new empty dirty tree to the production volume.

4. The method of claim 2, wherein scanning the pages not modified since creation of the snap set S0 includes:

obtaining page offsets and hashes of valid pages in snap set volumes in the snap set S0, skipping pages that have been updated on the production volume since creation of the S0; and issuing a remote read hash command to the snap set S0' from a remote system based on page offsets;

wherein comparing aspects of the pages includes comparing each of the page offsets and corresponding hashes.

5. The method of claim 1, further comprising:

creating a next snap set (Sn) against the production volume, wherein n=1;

upon occurrence of a next timeout value, creating a snap set (Sn') on the target site against paired production volume, wherein initiating the next data verification of the iterative data verifications comprises scanning pages of Sn and Sn' not modified since creation of the Sn and not verified since creation of Sn−1;

comparing aspects of the pages Sn and Sn';

upon determining the aspects of the pages Sn and S' are the same, the operations further comprise:

marking Sn as a verified recovery snap set, the Sn configured for synchronous replication fast recovery; and initiating another data verification of the iterative data verifications, wherein n=n+1.

6. The method of claim 5, wherein upon creating the next snap set Sn against the production volume, the snap set Sn inherits an A2H dirty tree of the production volume, the method further comprising assigning a new empty dirty tree to the production volume.

7. The method of claim 5, wherein scanning the pages not modified since Sn creation and not verified since Sn−1 creation includes:

obtaining page offsets on an aggregated dirty tree between snap sets Sn and Sn−1 that marks pages written between creation of Sn and Sn−1; and retrieving hash handles of the pages, skipping pages that are on the new dirty tree.

8. A system for online iterative data verification for synchronous replication at a storage system including a source site and a target site, the system comprising:

a memory comprising computer-executable instructions; and a processor operable by a storage system, the processor executing the computer-executable instructions, the computer-executable instructions when executed by the processor cause the processor to perform operations comprising:

during an active synchronous replication process between the source site and the target site, performing:

identifying inflight inputs/outputs (IOs), comprising:

creating a snap set (S0) against a production volume, the snap set S0 created as a base for a first data verification; and upon expiration of a timeout value, the timeout value specifying a maximum amount of time that can elapse before a snap set created at the source site must be saved at the target site, assigning the snap set S0 as a recovery snap set, and creating a snap set (S0') on the target site against paired production volume;

performing the first data verification on the source site and the target site, the first data verification performed for IOs that are not inflight IOs; and performing iterative data verifications during each of one or more replication cycles, the iterative data verifications verifying only data written to the target site since one of the first data verification and a previously performed data verification excluding inflight IOs at the time of verification.

9. The system of claim 8, wherein:

the inflight IOs indicating write off operations that are transmitted from the source site to the target site but are determined to have not yet been stored at the target site; and wherein the first data verification comprises scanning pages of snap sets S0 and S0' that have not been modified since creation of the snap set S0, comparing aspects of the pages, and upon determining the aspects of the pages are the same, initiating a next data verification of the iterative data verifications.

10. The system of claim 9, wherein upon creating the snap set S0 against the production volume, the snap set S0 inherits an address-to-hash (A2H) dirty tree of the production volume, the operations further comprising assigning a new empty dirty tree to the production volume.

11. The system of claim 9, wherein scanning the pages not modified since creation of the snap set S0 includes:

obtaining page offsets and hashes of valid pages in snap set volumes in the snap set S0, skipping pages that have been updated on the production volume since creation of the S0; and issuing a remote read hash command to the snap set S0' from a remote system based on page offsets;

wherein comparing aspects of the pages includes comparing each of the page offsets and corresponding hashes.

12. The system of claim 8, wherein the operations further comprise:

creating a next snap set (Sn) against the production volume, wherein n=1;

upon occurrence of a next timeout value, creating a snap set (Sn') on the target site against paired production volume, wherein initiating the next data verification of the iterative data verifications comprises scanning pages of Sn and Sn' not modified since creation of the Sn and not verified since creation of Sn−1;

comparing aspects of the pages Sn and Sn';

upon determining the aspects of the pages Sn and S' are the same, the operations further comprise:

marking Sn as a verified recovery snap set, the Sn configured for synchronous replication fast recovery; and initiating another data verification of the iterative data verifications, wherein n=n+1.

13. The system of claim 12, wherein upon creating the next snap set Sn against the production volume, the snap set Sn inherits an A2H dirty tree of the production volume, the operations further comprising assigning a new empty dirty tree to the production volume.

14. The system of claim 12, wherein scanning the pages not modified since Sn creation and not verified since Sn−1 creation includes:

obtaining page offsets on an aggregated dirty tree between snap sets Sn and Sn−1 that marks pages written between creation of Sn and Sn−1; and retrieving hash handles of the pages, skipping pages that are on the new dirty tree.

15. A computer program product embodied on a non-transitory computer readable medium, the computer program product including instructions that, when executed by a computer, causes the computer to perform operations comprising:

during an active synchronous replication process between the source site and the target site, performing:

identifying inflight inputs/outputs (IOs), comprising:

creating a snap set (S0) against a production volume, the snap set S0 created as a base for a first data verification; and upon expiration of a timeout value, the timeout value specifying a maximum amount of time that can elapse before a snap set created at the source site must be saved at the target site, assigning the snap set S0 as a recovery snap set, and creating a snap set (S0') on the target site against paired production volume;

performing the first data verification on the source site and the target site, the first data verification performed for IOs that are not inflight IOs; and performing iterative data verifications during each of one or more replication cycles, the iterative data verifications verifying only data written to the target site since one of the first data verification and a previously performed data verification.

16. The computer program product of claim 15, wherein the inflight IOs indicating write operations that are transmitted from the source site to the target site but are determined to have not yet been stored at the target site; and wherein the first data verification comprises scanning pages of snap sets S0 and S0' that have not been modified since creation of the snap set S0, comparing aspects of the pages, and upon determining the aspects of the pages are the same, initiating a next data verification of the iterative data verifications excluding inflight IOs at the time of verification.

17. The computer program product of claim 16, wherein upon creating the snap set S0 against the production volume, the snap set S0 inherits an address-to-hash (A2H) dirty tree of the production volume, the operations further comprising assigning a new empty dirty tree to the production volume.

18. The computer program product of claim 16, wherein scanning the pages not modified since creation of the snap set S0 includes:

obtaining page offsets and hashes of valid pages in snap set volumes in the snap set S0, skipping pages that have been updated on the production volume since creation of the S0; and issuing a remote read hash command to the snap set S0' from a remote system based on page offsets;

wherein comparing aspects of the pages includes comparing each of the page offsets and corresponding hashes.

19. The computer program product of claim 15, wherein the operations further comprise:

creating a next snap set (Sn) against the production volume, wherein n=1;

upon occurrence of a next timeout value, creating a snap set (Sn') on the target site against paired production volume, wherein initiating the next data verification of the iterative data verifications comprises scanning pages of Sn and Sn' not modified since creation of the Sn and not verified since creation of Sn−1;

comparing aspects of the pages Sn and Sn';

upon determining the aspects of the pages Sn and S' are the same, the operations further comprise:

marking Sn as a verified recovery snap set, the Sn configured for synchronous replication fast recovery; and initiating another data verification of the iterative data verifications, wherein n=n+1.

20. The computer program product of claim 19, wherein upon creating the next snap set Sn against the production volume, the snap set Sn inherits an A2H dirty tree of the production volume, the operations further comprising assigning a new empty dirty tree to the production volume; and wherein scanning the pages not modified since Sn creation and not verified since Sn−1 creation includes:

obtaining page offsets on an aggregated dirty tree between snap sets Sn and Sn−1 that marks pages written between creation of Sn and Sn−1; and retrieving hash handles of the pages, skipping pages that are on the new dirty tree.

* * * * *